UNITED STATES PATENT OFFICE.

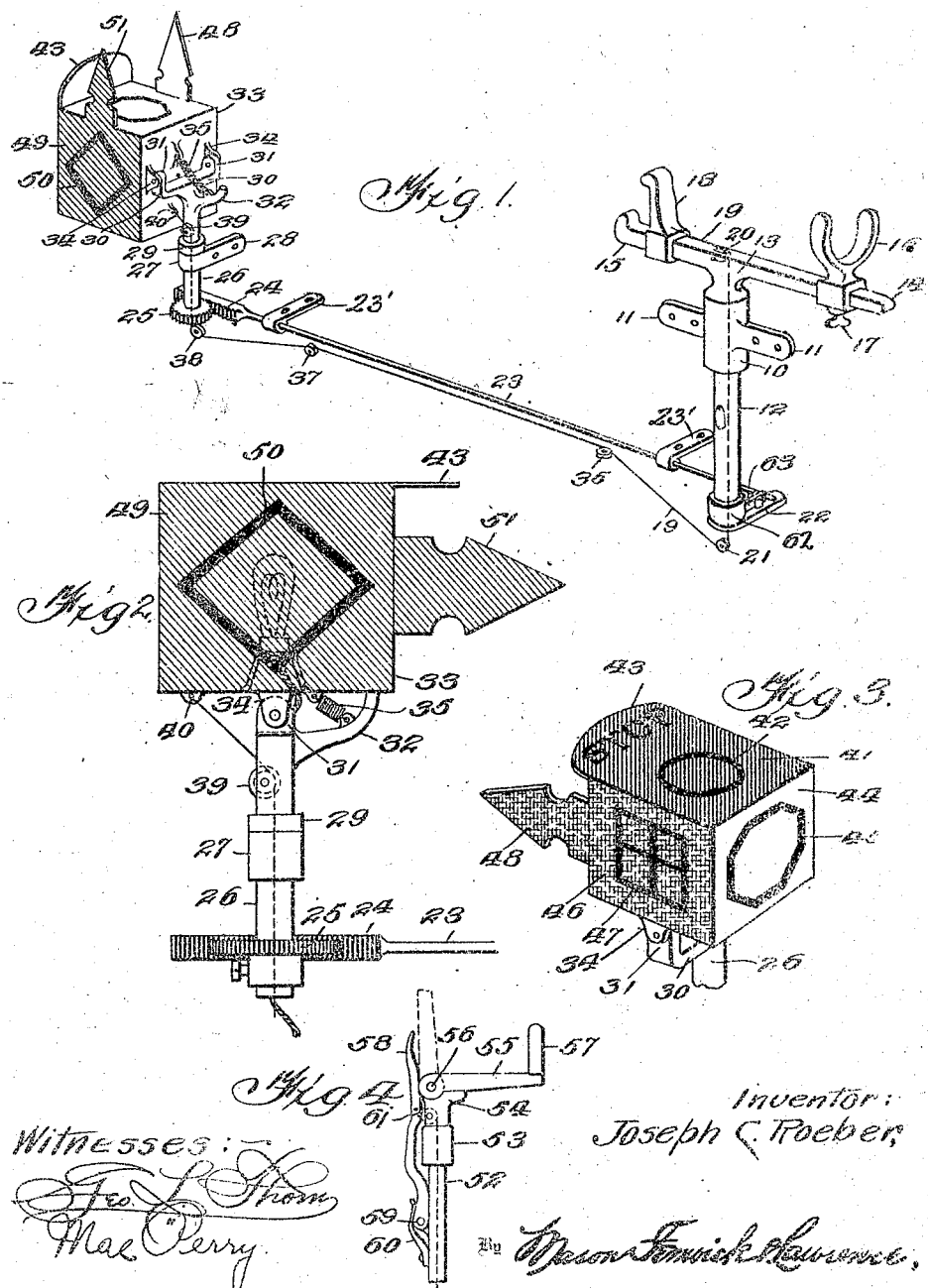

JOSEPH C. ROEBER, OF NEW YORK, N. Y.

AUTOMOBILE-SIGNAL.

1,241,444.  Specification of Letters Patent.  Patented Sept. 25, 1917.

Application filed April 14, 1915, Serial No. 21,406. Renewed August 27, 1917. Serial No. 188,483.

*To all whom it may concern:*

Be it known that I, JOSEPH C. ROEBER, a citizen of the United States, residing at New York, in the county of New York and State of New York, have invented certain new and useful Improvements in Automobile-Signals; and I do hereby declare the following to be a full, clear, and exact description of the invention, such as will enable others skilled in the art to which it appertains to make and use the same.

This invention relates to automobile signals and more particularly to a movable unit for attachment upon an automobile to notify the following cars as to the course of action being taken by the driver on the automobile to which the signal is attached.

An object of this invention is to provide a movable signal having distinctive indications which may be manipulated by the driver of an automobile without removing his hand from the steering wheel.

A further object of this invention is the improved form of operating mechanism to be actuated by the arm of the driver of the car.

A further object of this invention is the provision of a swinging and rotatable housing to be operated by the driver of the car to display any one of the several indications on said housing.

A further object of this invention is a provision of a swinging housing having pointers formed thereon, so that any of said pointers may be exposed to the vision of a following driver.

A further object of this invention is a provision of indications including a color and geometric design which may be exposed to the vision of the following driver.

A further object of this invention is the provision of a movable signal for a vehicle, a lever for actuating said signal, and means for automatically returning said signal to a normal position.

Further objects will be apparent from the following specification, appended claims and drawings in which, Figure 1 is a perspective view of the elements of this invention detached from an automobile, Fig. 2 is a side elevation of a part thereof, Fig. 3 is a perspective view of the signal housing showing the remaining sides of the housing and Fig. 4 is a side elevation of a modified form of operating lever.

In the adaptation of a signal to the rear of an automobile, it is desired to have the signal of compact design to consume a minimum of space and the indications thereon of such a nature as to positively indicate the action being taken by the driver of the car equipped with this attachment.

In this invention, such features have been considered and the several parts comprising the elements of this invention are disclosed in the drawing in which 10 indicates a bearing which may be placed at any desired point near the driver's seat and this bearing is provided with ears 11 by which said bearing may be attached to the frame of the car. This bearing supports a shaft 12 which has a head 13 formed on the upper end thereof, of which the extensions 14 and 15 form portions thereof. A yoke 16 is slidably carried by the extension 14 and may be locked in any position on the stem 14 as by a thumb screw 17. A trip 18 is slidably carried by the extension 15 and this trip has one end of a cable 19 attached thereto, which passes over a pulley 20 carried by the head 13 and then downwardly through the shaft 12 to and about the pulley 21 disposed below the lower end of the shaft 12. The lower end of the shaft 12 has a crank 22 formed thereon to which one end of a connecting rod 23 is attached. This connecting rod when in place on the automobile will have bearings 23' to support the same at the necessary intervals to prevent undue vibration thereof, and the rear end of this rod terminates in a rack 24 with which a pinion 25 meshes.

The pinion 25 is carried by the lower end of a hollow shaft 26 which is vertically disposed in the bearing 27 from which an ear 28 extends to afford a means for supporting said bearing by the body or chassis of the automobile. The shaft 26 has a collar 29 formed thereon to support said shaft in the bearing and the upper end of said shaft terminates in the lateral extensions 30 from which the ears 31 rise. Said shaft also has an extension 32 formed thereon which serves as a stop for a housing pivotally mounted upon the ears 31. The ears 31 have a housing 33 pivoted thereto as by pins passing through the ears 34 formed on said housing, to allow said housing being swung from a normal position to that shown in Fig. 1 of the drawings. The housing and extension 32 are connected as by a coiled spring 35 which serves to normally return the housing to an upright position as shown in Figs. 2 and 3.

The cable 19, after passing about the pulley 21, passes over the necessary pulleys 36 and 37 to the pulley 38 after which its course is up through the shaft 26 to the pulley 39 from where it leaves the shaft 26 and is connected to the housing 33 as at 40. Manipulation of the trip 18 as by the driver's elbow will exert a tension on the cable 19 and thereby tilt the housing 33 to expose the normal top face thereof to the rear.

The housing 33 will confine a lighting element such as an incandescent light as shown in dotted lines in Fig. 2 of the drawing. For day service, the several indications will combine colors, pointers and geometrical designs. The normal top of the housing 33 will comprise a translucent plate 41 having a circular design 42 formed thereon and an extension 43 from the forward edge thereof bearing the word "Stop." The normal rear face of the housing will comprise a translucent plate 44 having an octagonal design 45 formed thereon. The indication of a course to the left comprises a translucent plate 46 on one side of the housing having a rectangular design 47 formed thereon and a pointer 48 extending from the forward edge of said side and an indication for a course to the right comprises a translucent plate 49 having a diamond 50 formed thereon and a pointer 51 extending from the forward edge of said side wall. As it is desired to accentuate the several indications, the plate 41 may be colored red, the plate 44 white, and the plate 49 green, so that when the light within the housing is illuminated, as for night usage, the diffused light through any one of the side walls, so provided with the translucent plate will indicate the course the driver is to take.

As it is desirous of having the parts return to a normal position when not otherwise moved, a bearing 62 which may be carried by the body of the car may be provided for the lower end of the shaft 12 and a spring 62 may extend from this bearing to engage a pin carried by the crank 22 so that the shaft 12 will assume the normal position.

A decided benefit of this type of signal is that it may be used in the combination with the fixed tail light usually required for such vehicles to form a combination of lights of which each combination will have a definite meaning as the tail light will disclose a constant color, with which the color disclosed by the signal may form the combination.

Fig. 4 shows a slight modification in the operating arm in which the shaft 52 is supported by the bearing 53 and has a head 54 formed thereon to which the arm 55 is pivoted as at 56. This arm supports the arm rest 57 which may be swung to the position shown in dotted lines for any desired reason, such as to facilitate the driver's dismounting from the car. A lever 58 is pivoted as at 59 to the shaft 52 and has a spring 60 to normally hold it in vertical position. This lever extends in the path of the driver's elbow so that rearward movement of his arm will actuate the lever and tilt the housing 33 through the agency of the cable 61 which is attached to said lever and which passes over the necessary pulleys to change the course of travel of said cable as desired.

Having thus described my invention, I claim:—

1. In a signal, a movable arm, a yoke carried by said arm to receive an operator's arm, a slide also carried by the arm to receive movement from an operator's elbow, a rotatable housing, said housing being fulcrumed to tilt and connections from said yoke and slide to said housing to rotate or tilt the same.

2. In a signal of the class described, a housing, an illuminating element in said housing, translucent side walls for said housing, said housing being rotatable to present certain of the side walls to view, said housing being fulcrumed to present the normal top as a side wall, pointers extending from the edges of some of said side walls, and means for rotating or tilting said housing.

3. In a signal of the class described, a housing, said housing being fulcrumed to dispose the top wall as a side wall, a rotatable shaft supporting said housing, said shaft having ears formed thereon, said housing being fulcrumed to said ears, a spring connecting said housing and said shaft biasing said housing to a normal position and means for rotating said shaft and for tilting said housing.

In testimony whereof I affix my signature in presence of two witnesses.

JOSEPH C. ROEBER.

Witnesses:
 HENRY F. ROEBER,
 GEORGE L. THOM.